United States Patent
Carmello et al.

(10) Patent No.: US 7,678,343 B2
(45) Date of Patent: Mar. 16, 2010

(54) METALLIC MONOLITH CATALYST SUPPORT FOR SELECTIVE GAS PHASE REACTIONS IN TUBULAR FIXED BED REACTORS

(75) Inventors: Diego Carmello, Mogliano Veneto (IT); Andrea Marsella, Paese (IT); Pio Forzatti, Monza (IT); Enrico Tronconi, Arcore (IT); Gianpiero Groppi, Segrate (IT)

(73) Assignee: Ineos Vinyls UK Ltd., Runcorn, Cheshire (GB)

( * ) Notice: Subject to any disclaimer, the term of this patent is extended or adjusted under 35 U.S.C. 154(b) by 855 days.

(21) Appl. No.: 09/746,219

(22) Filed: Dec. 22, 2000

(65) Prior Publication Data

US 2002/0038062 A1 Mar. 28, 2002

(30) Foreign Application Priority Data

Dec. 24, 1999 (GB) ................................. 9930666.4
Dec. 29, 1999 (GB) ................................. 9930751.4
Sep. 18, 2000 (EP) ................................. 00308126

(51) Int. Cl.
*B01D 50/00* (2006.01)
*B01D 53/34* (2006.01)

(52) U.S. Cl. .................. 422/177; 422/168; 422/180

(58) Field of Classification Search ................ 422/177, 422/168, 171, 180
See application file for complete search history.

(56) References Cited

U.S. PATENT DOCUMENTS

| | | | | |
|---|---|---|---|---|
| 3,857,680 A | | 12/1974 | Porta et al. ............... | 23/288 |
| 3,890,104 A | | 6/1975 | Porta et al. ............... | 23/288 |
| 4,305,910 A | * | 12/1981 | Kudo et al. .............. | 422/179 |
| 4,366,093 A | * | 12/1982 | Shiozaki et al. .......... | 502/439 |
| 4,382,021 A | * | 5/1983 | Laurer et al. ............ | 502/225 |
| 4,705,621 A | * | 11/1987 | Penick ..................... | 208/146 |
| 4,740,644 A | * | 4/1988 | Eichhorn et al. .......... | 570/245 |
| 4,888,320 A | * | 12/1989 | Ihara et al. .............. | 502/304 |

(Continued)

FOREIGN PATENT DOCUMENTS

EP 0113513 B1 3/1986

(Continued)

OTHER PUBLICATIONS

Xu et al., "Structured Catalysts and Reactors" (A. Cybulski et al. Eds.), M. Dekker, New York, 1998, pp. 599-615.

(Continued)

*Primary Examiner*—M. Alexandra Elve
(74) *Attorney, Agent, or Firm*—Nixon & Vanderhye

(57) ABSTRACT

There is disclosed a catalyst support for selective gas phase reactions in a tubular fixed bed reactor comprising a metallic monolith having channels the walls of which are adapted to receive a catalytically active phase or an intermediate layer acting as a carrier for a catalytically active phase. The monoliths are coated with catalytically active material and loaded lengthwise into tubular reactors, the channels being parallel to the length of the reactors. The catalysts are particularly useful in the chlorination/oxychlorination of alkenes and alkanes, and the oxidation of alkenes. Compared with the use of conventional catalysts in pellet form or in the form of ceramic monoliths the catalysts of the invention offer greater yields and selectivity, the avoidance of hot spots, greater catalyst life and flexibility in use.

9 Claims, 6 Drawing Sheets

U.S. PATENT DOCUMENTS

| | | | | |
|---|---|---|---|---|
| 5,099,085 | A | | 3/1992 | Strasser et al. ............... 570/245 |
| 5,166,120 | A | * | 11/1992 | Deller et al. ................. 502/225 |
| 5,208,206 | A | * | 5/1993 | Yasaki et al. ................. 502/334 |
| 5,445,786 | A | * | 8/1995 | Harada et al. ................... 419/2 |
| 5,466,415 | A | * | 11/1995 | Brundage et al. ............. 419/67 |
| 5,472,927 | A | * | 12/1995 | Mulder et al. ............... 502/439 |
| 5,841,009 | A | * | 11/1998 | Carmello et al. ............. 570/245 |
| 5,883,138 | A | * | 3/1999 | Hershkowitz et al. ........ 518/703 |
| 5,986,152 | A | | 11/1999 | Muller et al. |
| 6,040,467 | A | | 3/2000 | Papavassiliou et al. |
| 6,171,556 | B1 | * | 1/2001 | Burk et al. ................... 422/173 |
| 6,314,722 | B1 | * | 11/2001 | Matros et al. ................. 60/274 |
| 6,388,145 | B1 | | 5/2002 | Kustov et al. |
| 6,482,375 | B1 | * | 11/2002 | van der Wal et al. ........ 423/210 |

FOREIGN PATENT DOCUMENTS

| | | |
|---|---|---|
| EP | 0327177 B1 | 11/1992 |
| EP | 0326392 B1 | 3/1994 |
| EP | 0689870 A1 | 1/1996 |
| EP | 0512917 B1 | 10/1997 |
| GB | 1492929 | 11/1977 |

OTHER PUBLICATIONS

Brinker et al., "Sol-Gel Science. The physics and chemistry of sol-gel processing" Academic Press, Boston, 1990, pp. 840-849.

M.F.M. Zwinkles, S.G. Jaras, P. Govind Menon in "Preparation of Catalysts VI", (G. Poncelet et al. Eds.) Elsevier, Amsterdam, 1995, pp. 85-94.

P. Govind Menon, M.F.M. Zwinkels et al., Kinetics and Catalysis, 39, 670 (1998), pp. 615-624.

* cited by examiner

METALLIC MONOLITH CATALYST SUPPORT FOR SELECTIVE GAS PHASE REACTIONS IN TUBULAR FIXED BED REACTORS

CROSS-REFERENCE TO RELATED APPLICATIONS

The present application claims priority under 35 U.S.C. § 119 to Great Britain Patent Application Number 9930666.4 filed Dec. 24, 1999, which is incorporated herein by reference in its entirety.

FIELD OF THE INVENTION

The present invention relates to monolith catalyst supports for selective gas phase exothermic and endothermic reactions carried out in fixed bed tubular reactors. In particular the present invention refers to metallic monolith catalyst supports showing improved selectivity and increased catalyst lifetime combined with very low pressure drop along the reactor.

BACKGROUND OF THE INVENTION

It is well known that gas phase exothermic catalytic reactions present a number of difficulties when performed in large reactors on an industrial scale. The main problem is how to dissipate the heat released as the reagents are converted into products.

In the prior art it is known that fluid bed reactors have been developed in order to overcome that problem. However they have serious drawbacks, e.g. difficulty in scaling up from the pilot stage to an industrial reactor, catalyst losses due to carry over from the reactors, and low selectivity due to the back mixing regime of the fluid bed. Moreover sometimes it is not possible to have the catalyst suitable for a specific reaction in powder form and with such mechanical properties as are appropriate for a fluid bed reactor.

It is also known from the prior art how to carry out exothermic reactions recycled in fixed bed reactors packed with catalysts in pellet form. However hot spots are present in the catalytic bed, as it is difficult to remove the reaction heat. Hot spots lead to catalyst deactivation and to a decrease in selectivity. As a further disadvantage of the packed bed reactor, the pressure drop is typically very large across the length of the reactor. In an industrial plant such a pressure drop requires that the reacting gases should be compressed to high pressure. This involves a high energy consumption. Further, the unreacted gases have to be compressed before they are used in the reactor.

The prior art does not teach how to carry out an exothermic reaction in a fixed bed reactor operated in a nearly isothermal mode, and achieving high selectivity and very low pressure drop. In industrial practice, in order to reduce the hot spot temperatures with the pellet catalyst beds, a series of complicated measures must be adopted, including narrow tubes, distributed feeds along the reactor, multiple reactors, and multiple layers of catalysts with different activities and different levels of inert dilutions. All of these measures result in more expensive industrial plants and complex process operations; in any case the hot spot temperatures remain high.

Operation of endothermic reactions in packed-bed tubular catalytic reactors also involves difficulties associated with the efficient and uniform transport of the heat of reaction from the reactor tube walls to the catalytically active material, resulting in the formation of cold spots.

In order to overcome the above disadvantages, U.S. Pat. No. 5,099,085 describes the use of honeycomb monolithic catalyst supports (instead of conventional pellets) for exothermic selective chlorination and/or oxychlorination reactions in multitubular reactors with a fixed-bed arrangement of the catalyst. The materials used for preparing the monolith support are activated alumina, aluminum silicate, silica gel, titanium oxide, silicon carbide or mixtures of said materials, or sintered ceramics such a $\alpha\text{-}Al_2O_3$. Mullite and cordierite are preferred. With the ceramic monolith supports described in this patent and with the related process engineering measures it is possible to reduce the pressure drop, to suppress as far as possible the formation of hot spots and to increase the selectivity in the target products. The ceramic monolith supports have a length from a few centimeters up to about 20 cm and the cross-sectional size, corresponding to the diameter of the reactor tubes, is usually smaller than 20 to 50 mm. The individual catalyst modules (monoliths) are spaced from each other by glass spheres, having a diameter of 3 to 6 mm. From the industrial point of view the spherical packing for spacing makes difficult and complicated the loading of the reactor tubes with the monoliths. In addition, the short monolith length makes the loading operation even more difficult. A further disadvantage of the process of said patent resides in the fact that the hot spot is reduced in respect to the traditional fixed bed catalyst, but it is still too high. In order to obtain this reduced hot spot the reacting gases have to be introduced at different points of the reactor (see FIG. 1 of said patent) thereby creating a multireactor system in order to get better thermal control. Experiments carried out by the present Applicant using the monoliths according to said U.S. patent in a single reactor and feeding the reactants at one point, i.e. using a single reactor, have shown that the hot spot is too high and the selectivity too low for an industrial application (see comparative example).

SUMMARY OF THE INVENTION

The present invention is directed to, inter alia, catalyst supports for selective gas phase reactions in a tubular fixed bed reactor comprising a metallic monolith having channels the walls of which are adapted to receive a catalytically active phase or an intermediate layer acting as a carrier for a catalytically active phase.

The present Applicant has unexpectedly and surprisingly found a method for solving the above technical problem in fixed bed reactors by using monolith catalyst supports for selective gas-phase exothermic reactions in tubular reactors as defined hereinbelow.

PREFERRED EMBODIMENTS OF THE INVENTION

Figure 1:
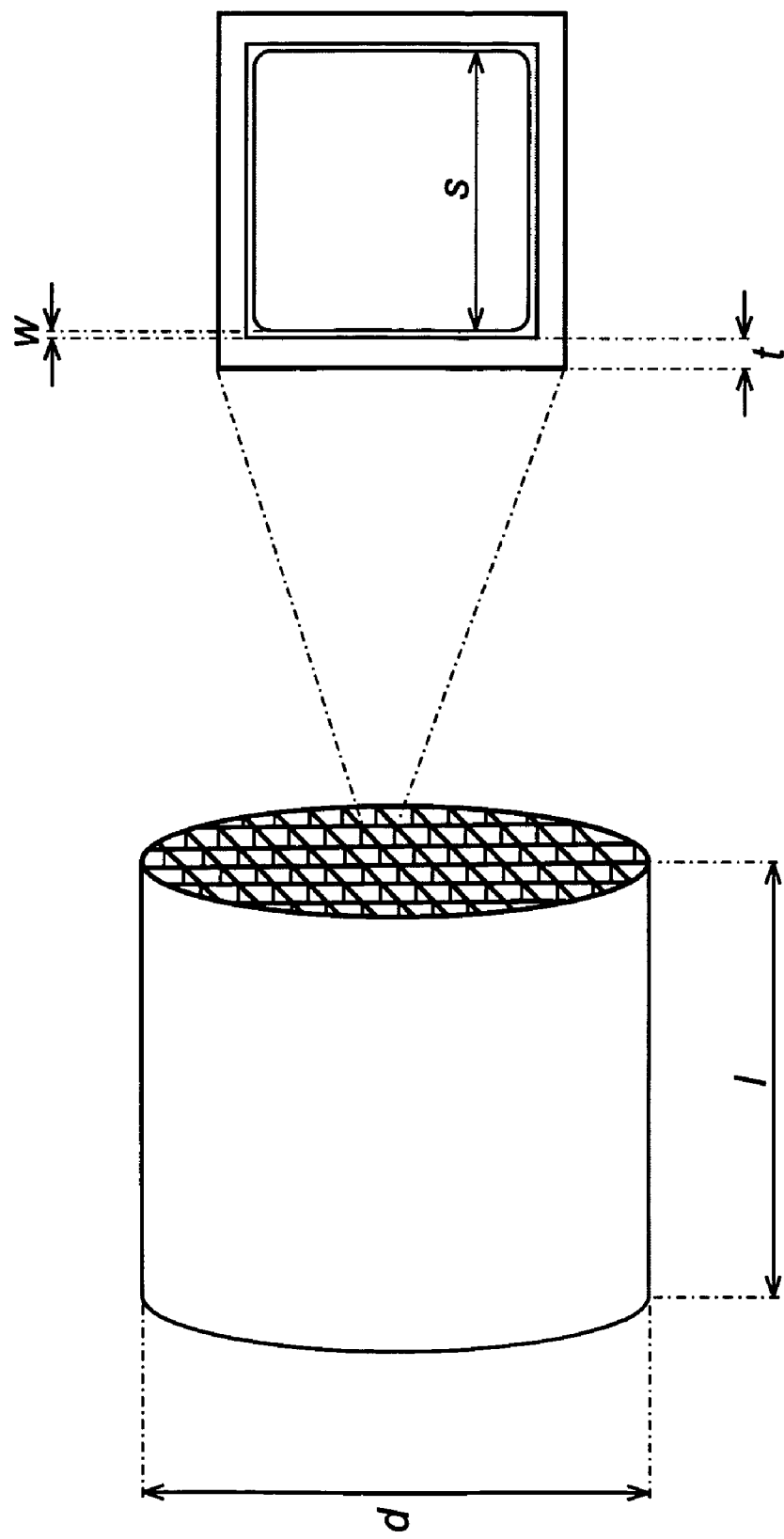
FIG. 1 is a representative schematic perspective view, not to scale, of a monolith support and catalyst according to the invention, used in the following Examples, and a sectional view of one of the cells of the catalyst.

According to the present invention a metallic monolith catalyst support for selective gas phase exothermic reactions in a tubular fixed bed reactor comprises channels wherein the catalytically active phase is deposited on the walls of the channels of the monolith, optionally on an intermediate layer acting as a carrier.

It has been found by the present Applicant that the metallic monolith is at the same time the support of the catalytically active phase and the medium for removing efficiently the heat of reaction and substantially avoiding the hot spot of the fixed bed reactors.

The monolith is suitably provided with channels that are substantially parallel to the longitudinal axis of the monolith and of the reactor in which it is to be used.

The perpendicular cross section of the channels, hereinafter designated as "cells", is delimited by a closed line, represented by the perimeter of the cross section of the channels. Every regular or irregular shape of the cell perimeter can be used if necessary, the preferred ones being square, triangular, hexagonal and circular, since they are easy to manufacture. The cell density, i.e. the number of cells per unit cross sectional area of the monolith, is preferably at least 3 cells/cm$^2$, more preferably between 8 and 100 cells/cm$^2$, in order to assure a sufficient geometric surface of the monolith walls. The size of the cells, defined by means of the hydraulic diameter, i.e. four times the ratio of the cross sectional area to the perimeter of the cell, is generally less than 5 mm, preferably between 1 and 3 mm. This reduced size represents an advantage since it is possible to put more cells in the monolith per unit of cross sectional area. Although the cells can be different from each other in size, a uniform size is preferred since this makes the monolith easier to manufacture.

The volume fraction of the metallic support is preferably less than 0.9, more preferably between 0.15 and 0.6. This reduced fraction of metallic support represents an advantage since it allows the maintenance of high monolith void fractions, thus further reducing pressure drops. Further, a reduced volume fraction of the support allows an important saving of expensive support material and a reduction of the reactor weight.

The geometric surface area per unit volume of the monolith should preferably be at least 6 cm$^2$/cm$^3$, preferably at least 10 cm$^2$/cm$^3$. In this way the productivity of the reactor can be increased. By "productivity" is meant the amount of the desired product(s) per unit time and per unit volume of the reactor. In addition the requested overall catalyst inventory is achieved through a lower thickness of the catalyst layer to be deposited on the metal monolith surface with respect to the ceramic monolith. This represents an advantage since the thinner is the catalytic layer, the stronger is the adhesion, and therefore its stability in the reactor is improved.

The present Applicant has found that preferably it is sufficient to fix one of the above properties in the range indicated, i.e. the values of the cell density, or of the size of the cells, or of the thickness of the channel walls, or of the surface area per unit volume of the monolith, in order to obtain the best results of the invention. More preferably two of the above four properties are fixed, still more preferably three of them, even still more preferably all four of them.

The length of the monolith, it has been found, is not particularly limited; the preferred length is usually chosen on the basis of the cost or ease of production. Generally it is between 5 cm and the total length of the reactor tubes; preferably it is in the range 30 cm-1 m.

The metallic structure formed by the channel walls of the monoliths is continuous in order to ensure substantial elimination of hot spots in exothermic reactions, and of cold spots in endothermic ones. The monolith should be in contact with the fixed bed reactor tube walls in such a way as to provide sufficient heat removal.

It has been found by the present Applicant that the substantial elimination of hot spots can be obtained by preparing the monoliths by any known technique, such as extrusion of metals or metallic powders, folding and/or stacking metallic foils or sheets, provided that the above continuity is assured. The techniques for preparation of metallic monoliths are well known. See for example X. Xu and J. A. Moulijn in "Structured Catalysts and Reactors", (A. Cybulski and J. A. Moulijn Eds.), M. Dekker, New York, 1998. The metals suitable for making the monolith are not particularly limited. We mention as preferred copper, aluminum, nickel or their alloys. Other alloys, such as Fecralloy®, may also be used. Fecralloy® is an alloy comprising predominantly iron (72.8%), chromium (22%) and aluminum (5%), with minor amounts of yttrium (0.1%) and zinc (0.1%).

The catalytic material can be deposited on the surface of the monolith by any known technique. As far as the deposition is concerned, the monolith surface is usually covered by an intermediate layer of material that can make easier the deposition of catalytically active components and, if necessary, can avoid contact between the monolith material and the reaction environment. The material of the intermediate layer may be any compound suitable for the reaction to be carried out. The most common compounds are aluminum hydroxides, aluminum oxide-hydroxides, alumina, silica, zirconia, titania, magnesia, pumice, diatomaceous earth, zeolites or their mixtures, or mixed compounds.

As an example can be mentioned the so called washcoating technique, consisting in the deposition of a layer of intermediate material, often with high specific surface area, onto the surface of the monolith. Washcoating is usually performed by bringing the monolith into contact with a slurry of fine powder, or with a solution containing the desired compound with optional subsequent precipitation, or with a sol of the desired material followed by gelation. Alternatively the intermediate layer can be obtained by a number of other methods such as thermal coating, electroplating, anodization, chemical or physical vapour deposition, dipping in molten materials. For the washcoating techniques see e.g. Brinker et al., "Sol-Gel Science. The physics and chemistry of sol-gel processing", Academic Press, Boston, 1990; M. F. M. Zwinkels, S. G. Jaras, P. Govind Menon in "Preparation of Catalysts VI", (G. Poncelet et al. Eds.), Elsevier, Amsterdam, 1995; P. Govind Menon, M. F. M. Zwinkels et al., Kinetics and Catalysis, 39, 670 (1998).

The catalytically active components can be incorporated into the intermediate layer during the washcoating step or after the washcoat has been deposited, using any well known technique, such as dipping, chemical vapour deposition or in situ synthesis. In some cases the catalytically active components can be deposited directly onto the monolith walls, avoiding the intermediate washcoating step.

The reactor tubes are loaded by pushing the monoliths sequentially one after the other into the tubes. Usually the channels of each monolith are aligned in order to minimize the pressure drop across the tube.

The advantages of using metallic monoliths as catalyst supports for exothermic reactions are:
  to have a flat temperature profile along the tube, substantially avoiding hot spots and performing the reaction at the proper selected temperature; in such a way it is possible to prevent or to slow down the catalyst deactivation and to increase the selectivity of the reaction;

to adopt reactor tubes with larger diameters and so to reduce dramatically the number of tubes for the same capacity, hence allowing the cost of the plant to be reduced. The diameter of the conventional reactor tube is about 25 to 30 mm; with the monolith of the invention the diameter can reach 80 mm or even higher, preferably 50-80mm. On the contrary in the prior art, in order to minimize the hot spots, tubular fixed bed reactors are made up of tubes with narrow diameters. This is a disadvantage for the industrial capacity, since reactors with a large number of tubes are required;

to achieve very low pressure drop across the tube: this pressure drop is often over one order of magnitude less than the pressure drop in conventional packed bed tubular reactors; this lower pressure drop could be exploited in processes where it is necessary to recycle back unreacted products; in this case instead of using a compressor, a blower may be used with significant energy saving;

to carry out the exothermic reaction in one single reactor without splitting the inlet reactants along the reactor tube; this avoids the multiple feed inlets of the prior art, as stated above;

to use higher coolant temperatures in externally cooled tubular reactors for exothermic reactions while maintaining still acceptable hot spot temperatures in the catalytic bed: accordingly, the overall catalytic activity of the bed is enhanced and therefore the required amount of catalyst load can be reduced; and to achieve nearly isothermal conditions in fixed-bed reactors such as those obtained in fluid bed reactors, without difficulties associated with scaling up from the pilot stage to an industrial reactor, catalyst losses due to carry over from the reactors, and low selectivity due to the back mixing regime of the fluid bed.

The exothermic reactions in which the monolith of the invention can be applied are not particularly limited. It is suitably used for selective chlorination and/or oxychlorination of alkenes, e.g. ethylene, or alkanes, e.g. methane and ethane; and selective oxidation of alkenes, e.g. ethylene and propylene. As examples can be mentioned the conversion of ethylene with chlorine to 1,2-dichloroethane, the conversion of ethylene with hydrogen chloride and air or oxygen to give 1,2-dichloroethane, and the reaction of methane with chlorine.

The catalyst for the oxychlorination reaction of ethylene preferably contains copper, preferably in an amount of 1 to 12 wt % of the intermediate layer. Preferably the catalytically active material also comprises at least one of alkali metals, alkaline earth metals, group IIB metals and lanthanides in a total amount up to 10 wt % of the intermediate layer. Preferably the alkali metal is lithium or potassium, the alkaline earth is magnesium and the lanthanide is lanthanum or cerium, and each of them is present in an intermediate layer in an amount up to 6 wt %.

The catalytically active material for selective oxidation of alkenes contains for example silver. The catalytically active material may preferably also comprise at least one of alkali metals, alkaline earth metals, group IIB metals and lanthanides in a total amount preferably up to 5 wt % on the intermediate layer. Preferably the alkali metal is caesium, the alkaline earth is barium.

The catalyst for the oxychlorination of alkanes contains in the intermediate layer for example copper and an alkali metal in the atomic ratio 2:8. The alkali metal is preferably potassium or lithium. The catalytically active material may preferably also comprise at least one of alkaline earth metals, group IIB metals and lanthanides. Preferably the alkaline earth is magnesium and the lanthanide is lanthanum or cerium.

For the selective chlorination of alkenes and alkanes, the well known active components of the catalysts are used, for example alkali metals, alkaline earth metals, group IIB metals and lanthanides in a total amount preferably up to 30 wt % on the intermediate layer.

The carriers for the above active components of the catalysts of the above reactions are preferably aluminum hydroxides, aluminum oxide-hydroxides, alumina, silica, zirconia, titania, magnesia, pumice, diatomaceous earth, zeolites or their mixtures or mixed compounds.

In addition to the exothermic reactions, the metallic monolithic support can be used also for endothermic reactions in order to maintain the correct temperature substantially constant along the reactor tubes.

The following Examples refer to the oxychlorination reaction of ethylene to 1,2-dichloroethane, taken as representative of selective gas phase exothermic reactions. Such examples are given for illustrative purposes and are not intended to limit the scope of the invention. Some of the preferred embodiments of the invention described above are outlined below and include, but are not limited to, the following embodiments. As those skilled in the art will appreciate, numerous changes and modifications may be made to the preferred embodiments of the invention without departing from the spirit of the invention. It is intended that all such variations fall within the scope of the invention. In addition, the entire disclosure of each publication cited herein is hereby incorporated by reference.

EXAMPLES

The accompanying drawings are for the purpose of illustrating the invention.

Figure 2:
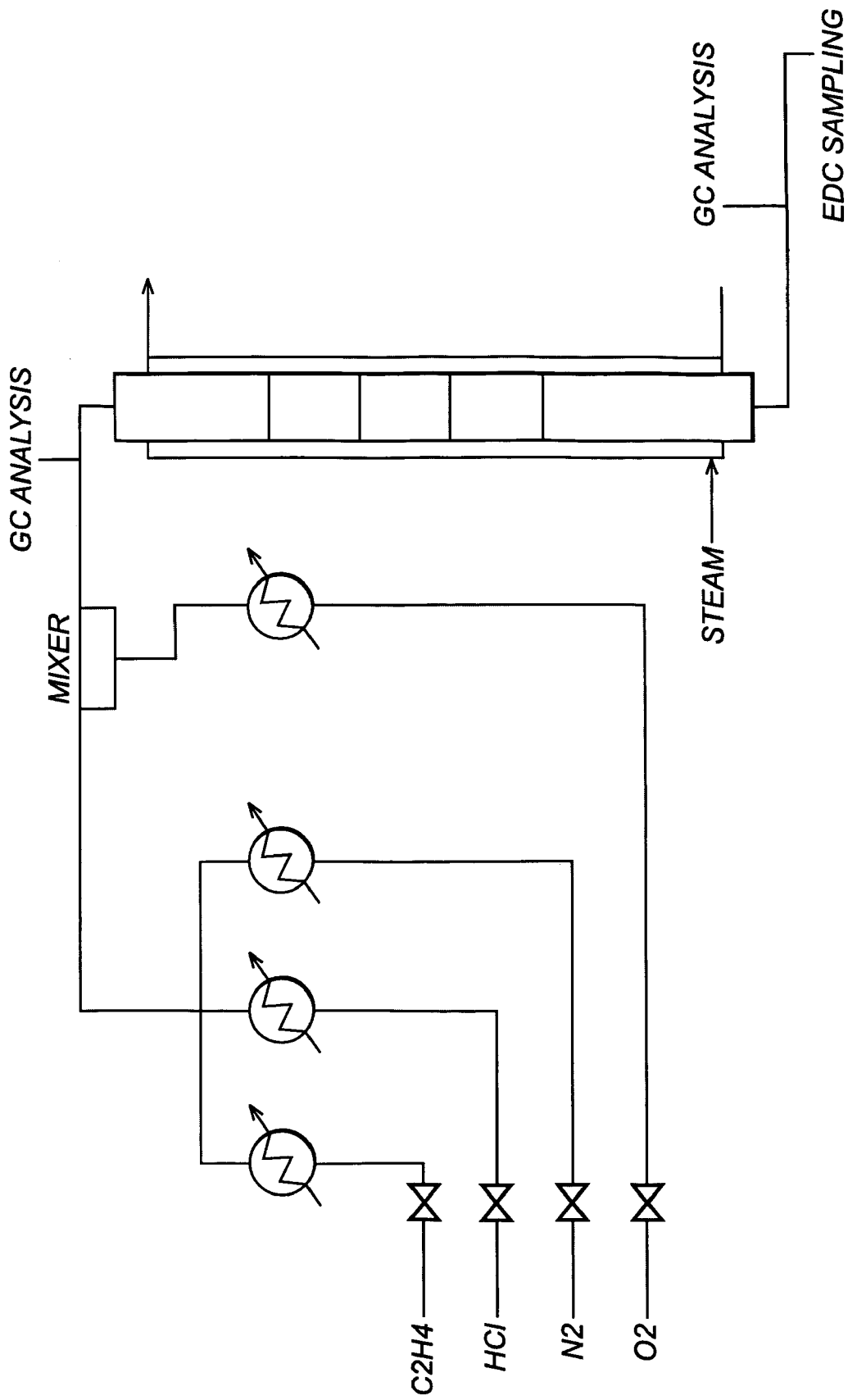
FIG. 2 is a diagram of the apparatus used in the activity tests.

In the drawings,

FIG. 1 comprises a schematic perspective view, not to scale, of a monolith support and catalyst according to the invention, used in the following Examples, and a sectional view of one of the cells of the catalyst;

FIG. 2 is a diagram of the apparatus used in the activity tests; and

FIGS. 3 to 6 are graphs illustrating the temperature profiles obtained in various test runs described below.

With reference to FIG. 1, four sets of monolith catalysts were prepared, with supports made of different metals or alloys: Fecralloy®, nickel, aluminum and copper.

Each monolith had a cylindrical shape with parallel channels of square cross section (see FIG. 1). The length (l) of each monolith was 50 cm, its external diameter (d) being the same as the internal diameter of the reactor tubes used for catalytic activity testing, as described later on. The side of the square cells (s) was 3.1 mm, while the wall thickness (t) was 0.43 mm.

A first layer of washcoating (carrier) was deposited by dipping into an aqueous slurry of commercial boehmite (supplied by Condea). After removal of excess liquid by blowing with air, the monolith was slowly dried under mild conditions. A layer of γ-alumina having a surface area of 190 m$^2$/g was applied as a washcoat onto the monolith walls, using the same procedure as above, followed by flash drying at 280° C. The concentration of the slurry and the withdrawal speed were adjusted in order to obtain a total layer thickness (w) of respectively 65 μm for the use in the tube 9 m long and 85 μm for the use in the tube 6.5 m long.

After calcination at increasing temperature up to 550° C., the washcoat was impregnated by dipping with an aqueous solution of the active components, i.e. copper chloride and potassium chloride, with a concentration suitable to obtain the desired concentration of the active components in the washcoat: 8% wt Cu and 0.8% wt. K. Finally the impregnated monoliths were dried at 150° C. for 4 hours. The void fraction of the so obtained catalytic bed was 0.7.

For comparative purposes a set of ceramic (cordierite) monoliths was also prepared. The ceramic monoliths had cylindrical shape with parallel channels having square cross section. The length of each monolith was 20 cm, its external diameter being the same as the internal diameter of the reactor tubes used for catalytic activity testing, as described later on. The internal side of the square cells was 0.5 mm, while the wall thickness was 0.9 mm. Although it is well known that ceramic monoliths with thinner walls can be obtained, the choice of the above parameters was determined by the necessity to keep the hot spot temperature as low as possible. In spite of that, during the activity tests it was necessary also to reduce the coolant temperature in order to moderate the hot spot temperature. Attempts to use monoliths with characteristics more similar to those of the metallic ones failed since they gave rise to unacceptable hot spot temperatures. On the other hand the above mentioned choice of parameters resulted in monoliths with low geometric surface area per unit volume, so it was necessary to increase the thickness of the washcoat layer in order to achieve a total quantity of active components per unit volume of the reactor sufficient to ensure the desired conversion values. The thickness of the washcoat layer, obtained by repeated impregnations, was 100 µm instead of 65 µm, with the same concentration of copper and potassium chlorides as the metallic monoliths. Due to the larger walls and washcoat thickness of the ceramic monoliths, the void fraction of the so obtained catalytic bed was 0.1.

The choice of the method used for catalytic activity testing is very important because the differences in terms of conversion and selectivity exhibited by different catalysts are usually small, but of great importance on an industrial scale. In order to obtain results which could be truly representative of the industrial reactor, a test was performed by using a tube having the same size as an industrial one and the same conditions (temperature, pressure, feed composition, feed flow rate) were adopted as those used in the industrial reactor. Under this point of view a part of the data reported below, concerning Fecralloy®, nickel, aluminum and copper based monoliths, was obtained in the pilot plant by using a tube having the same size as a typical industrial reactor, i.e. an inner diameter of 27.2 mm and a length of 9 m.

However, the peculiar properties of the catalyst or catalyst support of the present invention allow the use of the catalyst also in tubes having a size so large as to be unsuitable for industrial reactors operating with conventional packed beds of catalyst pellets. In order to point out other uses of the object of the present invention, the results obtained in very large tubes (low cost reactor) are shown later. The large tube chosen for the example had an internal diameter of 56.0 mm and a length of 9 m.

A further advantage of the catalyst of the present invention is that a very high conversion is obtained even in reactors equipped with tubes shorter than the conventional ones, simply by increasing the washcoat layer thickness. To demonstrate this, a few test runs were performed in a large tube (56.0 mm internal diameter) with a length of 6.5 m instead of 9 m.

The apparatus used for the activity tests is schematically shown in FIG. 2: it is a flow diagram illustrating the pilot plant for the catalytic oxychlorination of ethylene to 1,2-dichloroethane, which is used in the examples as representative of an exothermic reaction. The pilot reactor consisted of a single tube, which was loaded with the monolith catalyst samples before each test run. The reactors used were: two nickel tubes 9 m long with internal diameters of 27.2 mm (standard) or 56.0 mm (enlarged), and a nickel tube 6.5 m long with internal diameter of 56.0 mm. An external jacket with circulating boiling water was used to regulate the temperature profile. The reactor was equipped with one thermowell inserted into the central channel of the monoliths. A sliding thermocouple was used to record the temperature profile at different tube heights during the test. Two on-line gas chromatographs were used at the inlet and at the outlet of the reactor to control the reaction. The EDC (1,2-dichloroethane) was collected in a vessel containing isopropyl alcohol at about 0° C. and analyzed. This technique allows the collection also of the low boiling and water soluble compounds (chloroethanol, chloral, etc) as well as the unreacted HCl. The reactor feed was: 5200 $dm^3$ STP/hour of ethylene, 600 $dm^3$ STP/hour of oxygen, 2300 $dm^3$ STP/hour of HCl, 1000 $dm^3$ STP/hour of nitrogen. STP means standard temperature and pressure conditions, i.e. T=0° C. and P=1 Ata.

The oxygen was 6.5 vol % (the flammability limit at 210° C. and 7 Ata is about 8%). The inlet pressure of the reactor was 7 Ata, the inlet temperature was 150° C. and the temperature of the coolant was 240° C. in the case of metallic monoliths and 215° C. in the case of the ceramic monolith.

The results of the tests are reported in Table 1. The temperature profiles obtained in the most significant experiments are reported in FIGS. 3 to 6.

Figure 3:
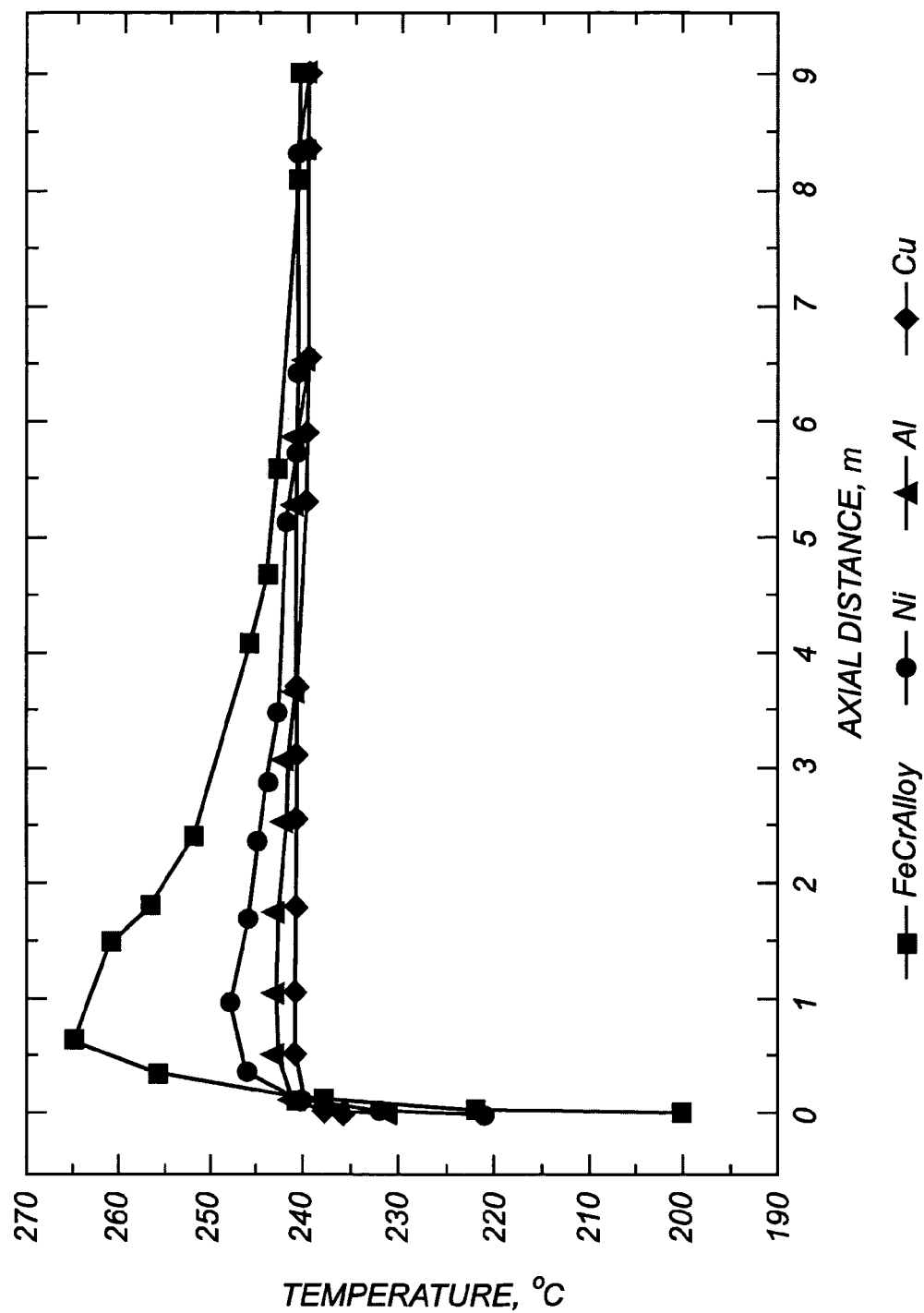
FIG. 3 represents temperature profiles obtained in test runs performed in a reactor.

FIG. 3 represents the temperature profiles obtained in test runs performed in the reactor having diameter=27.2 mm and length=9 m with catalysts supported, respectively, on Fecralloy®, nickel, aluminum and copper monoliths.

Figure 4:
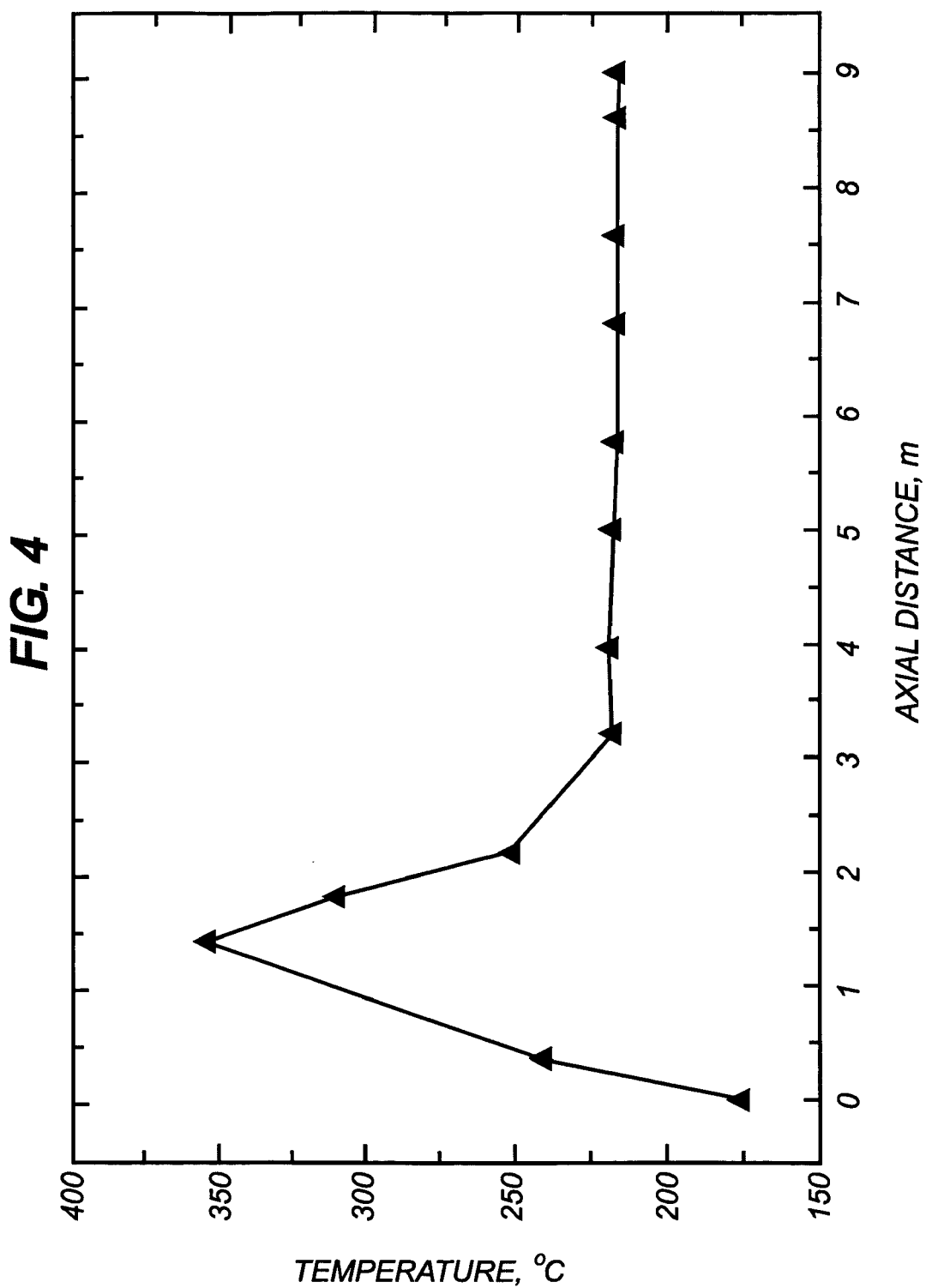
FIG. 4 represents a temperature profile obtained in a test run performed in a reactor.

FIG. 4 represents the temperature profile obtained in a test run performed in the reactor having diameter=27.2 mm and length=9 m with catalyst supported on cordierite monolith (comparative example).

Figure 5:
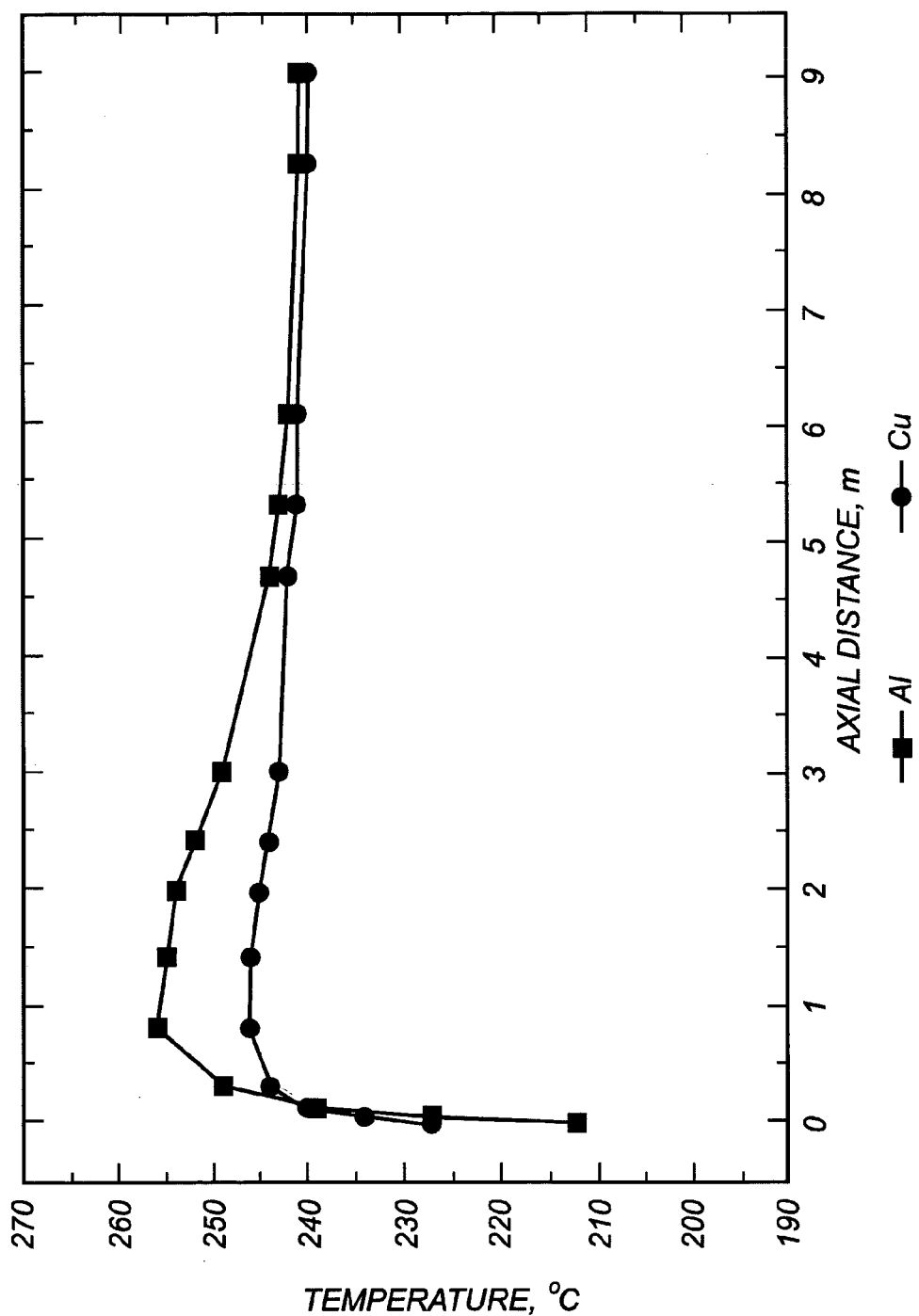
FIG. 5 represents temperature profiles obtained in test runs performed in a reactor.

FIG. 5 represents the temperature profiles obtained in test runs performed in the reactor having diameter=56.0 mm and length=9 m with catalyst supported, respectively, on aluminum and copper monoliths.

Figure 6:
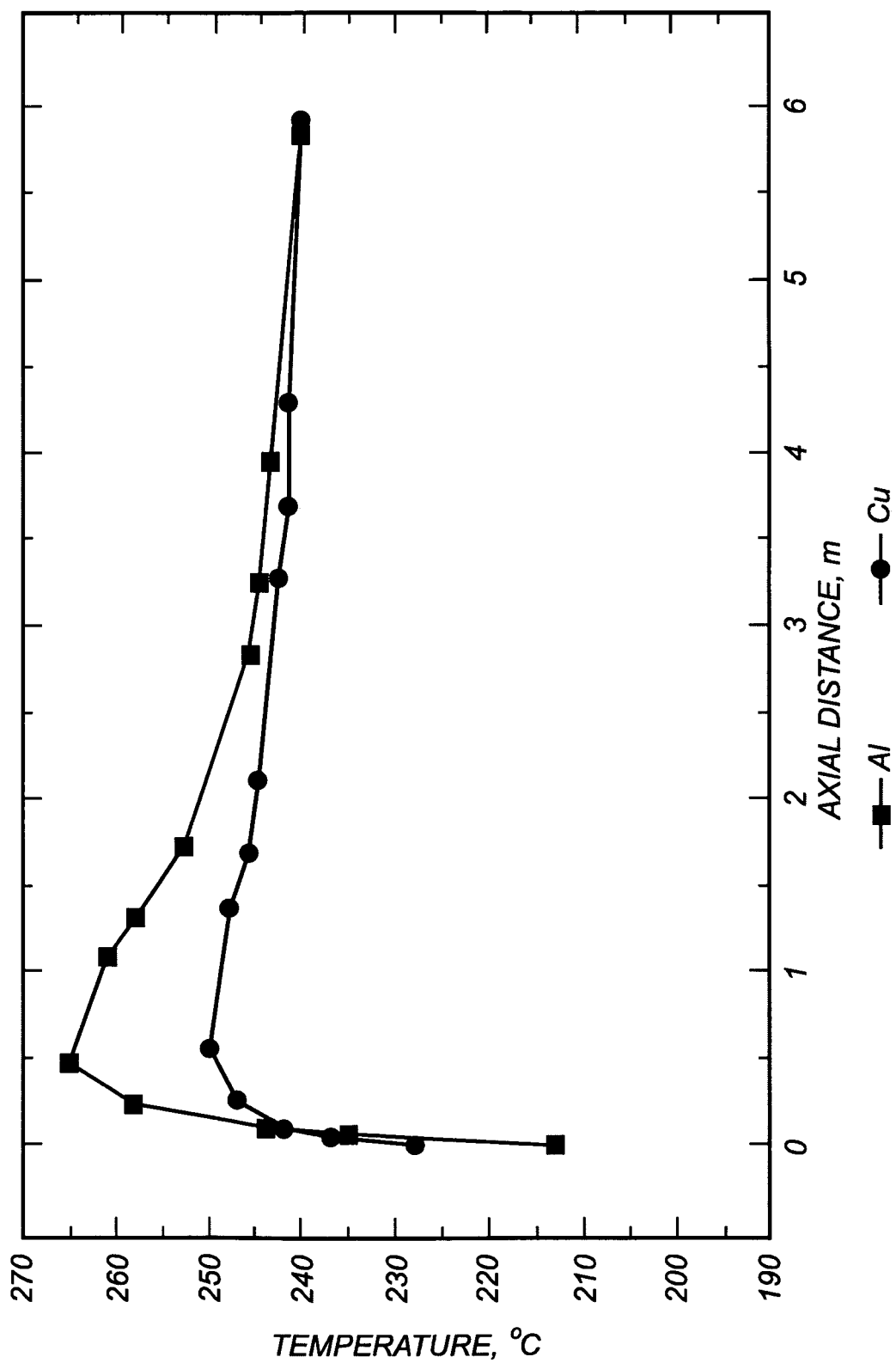
FIG. 6 represents temperature profiles obtained in test runs performed in a reactor.

FIG. 6 represents the temperature profiles obtained in test runs performed in the reactor having diameter=56.0 mm and length=6.5 m with catalyst supported, respectively, on aluminum and copper monoliths.

Under the adopted reaction conditions the $O_2$ and HCl conversions were always equal to or greater than 93.5% and 99%, respectively. The selectivity to 1,2-dichloroethane, obtained with metallic monoliths, was always greater than 98.5% by moles, in some cases even greater than 99.5% by moles. The selectivity to ethyl chloride, chlorinated by-products and to $CO_x$ (x being an integer equal to 1 or 2), was always low, depending substantially on the hot spot temperature: the lower is the temperature, the lower is the formation of undesired by-products. On the contrary, the use of catalysts supported on ceramic monoliths did not allow a selectivity to 1,2-dichloroethane higher than 97% by moles to be reached, because of the greater chlorinated by-products and $CO_x$ formation. The difference in yield of 1.5 to 2% by moles in the target products is very meaningful in industrial applications. The above results point out that the best comparison among the performances of different catalysts can be made by using the values of hot spot temperatures: the smaller is the difference between this value and the value of the coolant temperature, the better is the catalyst. From the reported results (see Table 1 and FIGS. 3 and 4) it is evident that all the catalysts based on metallic monoliths give better results than the catalyst supported on the ceramic one: the hot spot temperatures were lower than 270° C. in the present invention and higher than 350° C. in the comparison. The use of ceramic monoliths as a support gives place to hot spot temperatures too high to allow their use in an industrial reactor. On the contrary all the catalysts based on metallic monoliths give very flat temperature profiles in the standard industrial tubes (27.2 mm diameter). The difference with the coolant temperature is in the range from 2° C. to 17° C. Among them, the best results were obtained using nickel, aluminum and copper monoliths.

Further it is well known to the skilled in the art that the lower the hot spot temperature, the longer the catalyst lifetime. Therefore the metallic monolith catalysts of the present invention show an improved lifetime with respect to the prior art catalysts.

On the basis of these results aluminum and copper based monoliths were loaded in tubes much larger than the standard ones (56 mm diameter). The obtained hot spot temperature was only a bit higher than that observed in smaller tubes and the difference with the coolant temperature was 18° C. in the case of aluminum and only 7° C. in the case of the copper (FIG. 5).

The increase of washcoat layer thickness allowed the use of a shorter tube (6.5 m), owing to the increase of active components concentration per unit length of the tube. In spite of the increased reactivity, and thus of an increased heat production per unit length of the tube, the hot spot temperatures were only a bit higher than those observed in the longer tube with the same diameter: the difference was of 11° C. and, respectively, 4° C. using aluminum and copper based monoliths (FIG. 6).

The above results prove the feasibility of adopting larger reactor tubes for industrial applications. It is well known to the skilled in the art that the use of such large reactor tubes loaded with conventional catalysts in pellets is not feasible because of very high hot spot temperatures, with the disadvantages indicated above. In order to reduce the hot spots with the conventional catalysts in pellets it is necessary to drastically reduce the productivity. This brings uneconomical industrial results.

The pressure drop, under the same productivity, in the examples of the invention was always very low, i.e. far below 0.05 atm. In the comparative example using the ceramic monolith the pressure drop was significantly greater, although still below 0.1 atm. With respect to the pellet catalyst the pressure drop with the monolith of the present invention is drastically reduced, being lower by about two orders of magnitude.

What is claimed is:

1. A method for selectively reacting reagents in a gas phase exothermic reaction for the selective chlorination and/or oxychlorination of alkenes or alkanes comprising reacting said reagents in a tubular fixed bed reactor comprising a metallic monolith having channels with walls carrying a catalytically active phase or an intermediate layer carrying a catalytically active phase, wherein said catalytically active phase catalyses the selective chlorination and/or oxychlorination of alkenes or alkanes, and wherein the metallic monolith has a flat temperature profile in the tubular reactor whereby heat of reaction in said exothermic reaction is removed by the metallic monolith thereby reducing hot spots, said metallic monolith having:

i) a surface area per unit volume of at least 6 $cm^2/cm^3$,
   ii) a cell density of between 8 $cells/cm^2$ and 100 $cells/cm^2$, and
   iii) a length of between 30 cm to 1 m.

2. The method of claim 1, wherein the reaction is selected from the group consisting of the conversion of ethylene with chlorine to 1,2-dichloroethane, the conversion of ethylene with hydrogen chloride with air or oxygen to give 1,2-dichloroethane, the conversion of ethane with hydrogen chloride with air or oxygen to give a saturated or unsaturated chlorinated hydrocarbon, and the reaction of methane with chlorine.

3. The method of claim 1, wherein the catalyst for the oxychlorination reaction of ethylene contains copper in an amount of 1 to 12 wt % of the intermediate layer.

4. The method of claim 3, wherein the catalyst also comprises at least one alkali metal, alkaline earth metal, group IIB metal or lanthanide in a total amount up to 6 wt % of the intermediate layer.

5. The method of claim 1, wherein the catalyst for the oxychlorination reaction of ethane contains in the intermediate layer copper and an alkali metal in the atomic ratio 2:8.

6. The method of claim 5, wherein the catalyst also comprises at least one alkaline earth metal, group IIB metal or lanthanide.

TABLE 1

|  | Fecralloy | Nickel | Aluminum | Copper | Cordierite Cfr. | Aluminum | Copper | Aluminum | Copper |
|---|---|---|---|---|---|---|---|---|---|
| Tube diameter (mm) | 27.2 | 27.2 | 27.2 | 27.2 | 27.2 | 56.0 | 56.0 | 56.0 | 56.0 |
| Tube length (m) | 9.0 | 9.0 | 9.0 | 9.0 | 9.0 | 9.0 | 9.0 | 6.5 | 6.5 |
| Hot spot temperature (° C.) | 267 | 248 | 244 | 242 | 355 | 258 | 247 | 269 | 251 |
| Difference between hot spot and coolant temperature (° C.) | 27 | 8 | 4 | 2 | 140 | 18 | 17 | 29 | 11 |
| HCl conversion (%) | >99.99 | 99.40 | 99.14 | 99.00 | 99.50 | 99.92 | 99.35 | 99.86 | 99.00 |
| Selectivity to 1,2-dichloroethane (mol %) | 98.53 | 98.72 | 98.79 | 98.86 | 96.80 | 98.65 | 98.77 | 98.58 | 98.70 |
| Selectivity to ethyl chloride (mol %) | 0.31 | 0.34 | 0.35 | 0.33 | 0.39 | 0.38 | 0.35 | 0.37 | 0.35 |
| Selectivity to chlorinated by-products (mol %) | 0.61 | 0.57 | 0.54 | 0.49 | 1.24 | 0.56 | 0.51 | 0.60 | 0.58 |
| Selectivity to $CO_x$ (mol %) | 0.55 | 0.37 | 0.32 | 0.32 | 1.57 | 0.41 | 0.37 | 0.45 | 0.37 |

7. The method of claim 1, wherein the catalyst for the selective oxidation reaction of ethylene comprises at least silver, and at least one alkali and/or alkaline earth metal.

8. The method of claim 2, wherein the conversion of ethane with hydrogen chloride with air or oxygen produces 1,2-dichloroethane.

9. The method of claim 2, wherein the conversion of ethane with hydrogen chloride with air or oxygen produces vinyl chloride.

* * * * *